United States Patent [19]

Thomas et al.

[11] Patent Number: 4,761,577
[45] Date of Patent: Aug. 2, 1988

[54] WHEEL-MOUNTED ELECTRICAL POWER GENERATOR

[76] Inventors: Stephen E. Thomas, 38840 Godfrey Pl., Fremont, Calif. 94536; Mark S. Thomas, 1235 Wildwood Ave., Apt. 400, Sunnyvale, Calif. 94089

[21] Appl. No.: 69,321

[22] Filed: Jul. 2, 1987

[51] Int. Cl.⁴ .................. H02K 7/02; H02K 23/66
[52] U.S. Cl. .................. 310/67 A; 310/DIG. 6; 310/75 C
[58] Field of Search .............. 290/53; 310/67 R, 67 A; 361/399, 415; 340/58

[56] References Cited

U.S. PATENT DOCUMENTS 4,229,728 10/1980 Tremba .................. 310/68 B
4,539,496  9/1985 Thomas et al. .......... 310/67 A

FOREIGN PATENT DOCUMENTS 111656  8/1980 Japan .................. 310/40 MM

Primary Examiner—Patrick R. Salce
Assistant Examiner—D. L. Rebsch
Attorney, Agent, or Firm—Thomas Schneck

[57] ABSTRACT

A wheel mounted hub containing an electrical generator which is pivotally supported in arms of a yoke. The yoke and generator have an offset center of gravity, tending to give the yoke and generator a pendulum-like behavior within the housing. During wheel rotation, the generator tends to remain along a gravitational line of force, forcing a small wheel associated with the generator to turn against the hub. Around the outer periphery of the yoke, yet within the hub housing, is a circuit board which carries a power utilization circuit, so that the electrical path between the generator and the utilization circuit is very short. The circuit board may carry auxiliary circuits such as a current limiter, a generator disengaging circuit, a daylight deactivating circuit and a circuit for allowing operation regardless of direction of rotation.

28 Claims, 3 Drawing Sheets

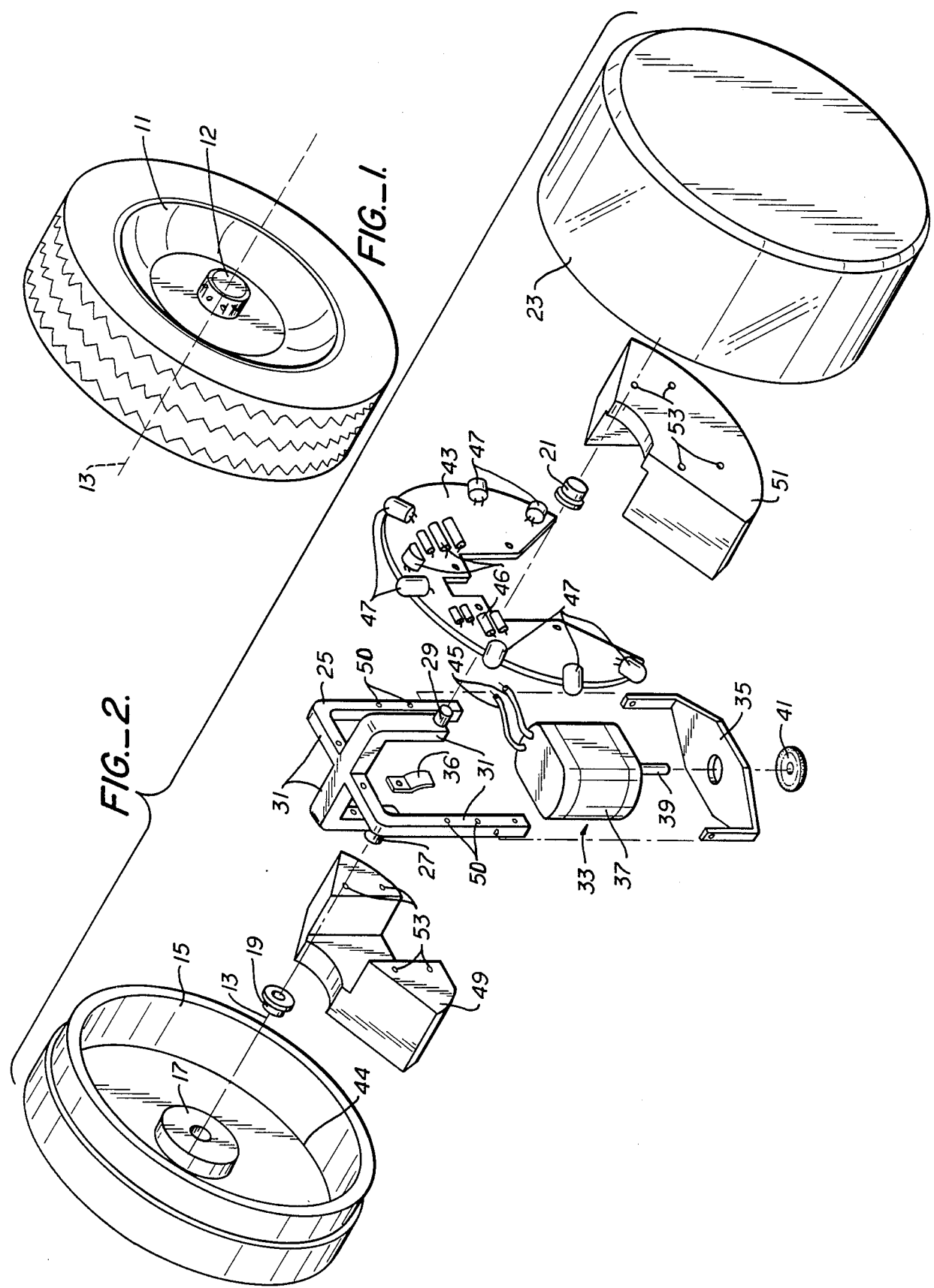

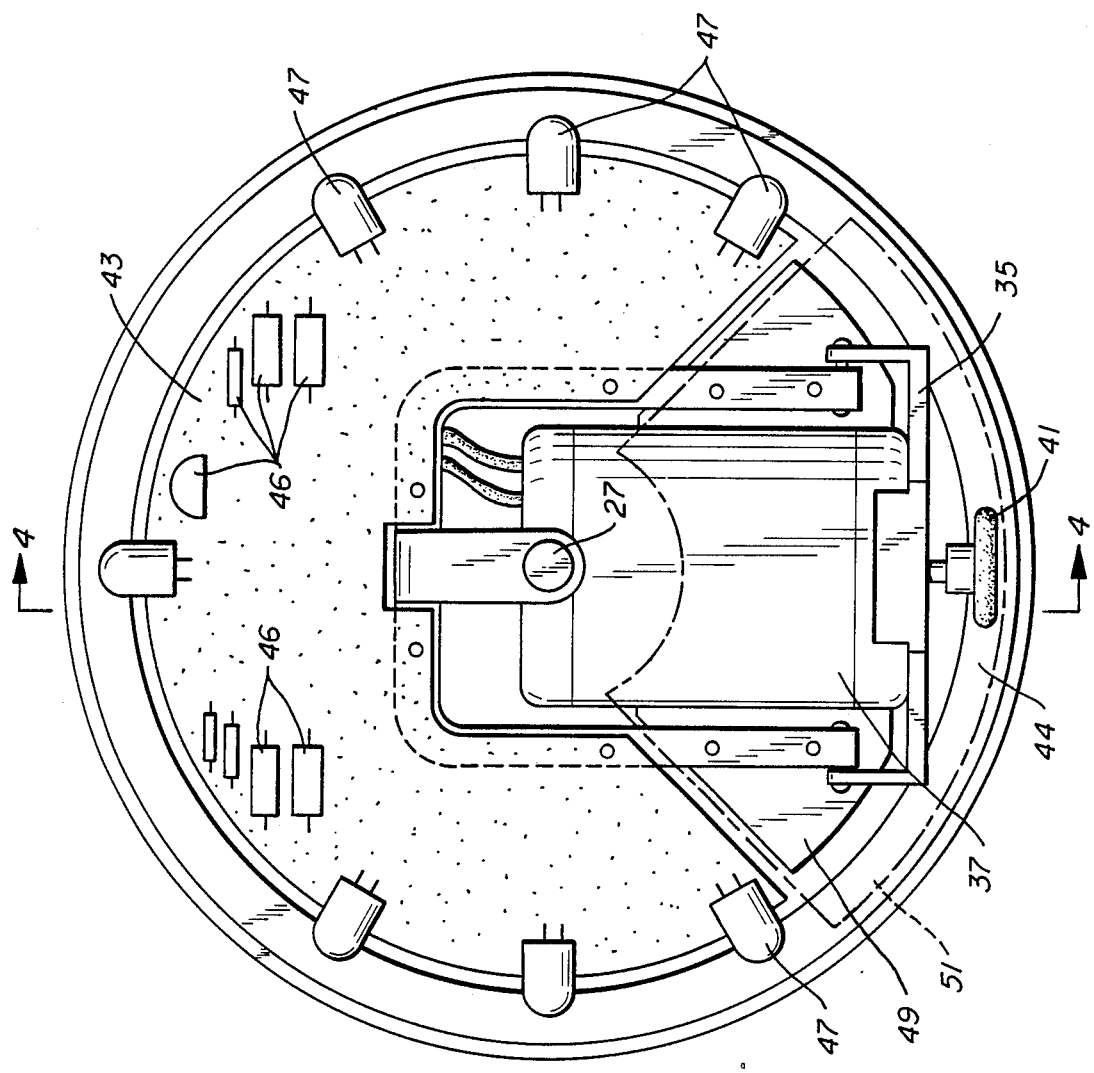
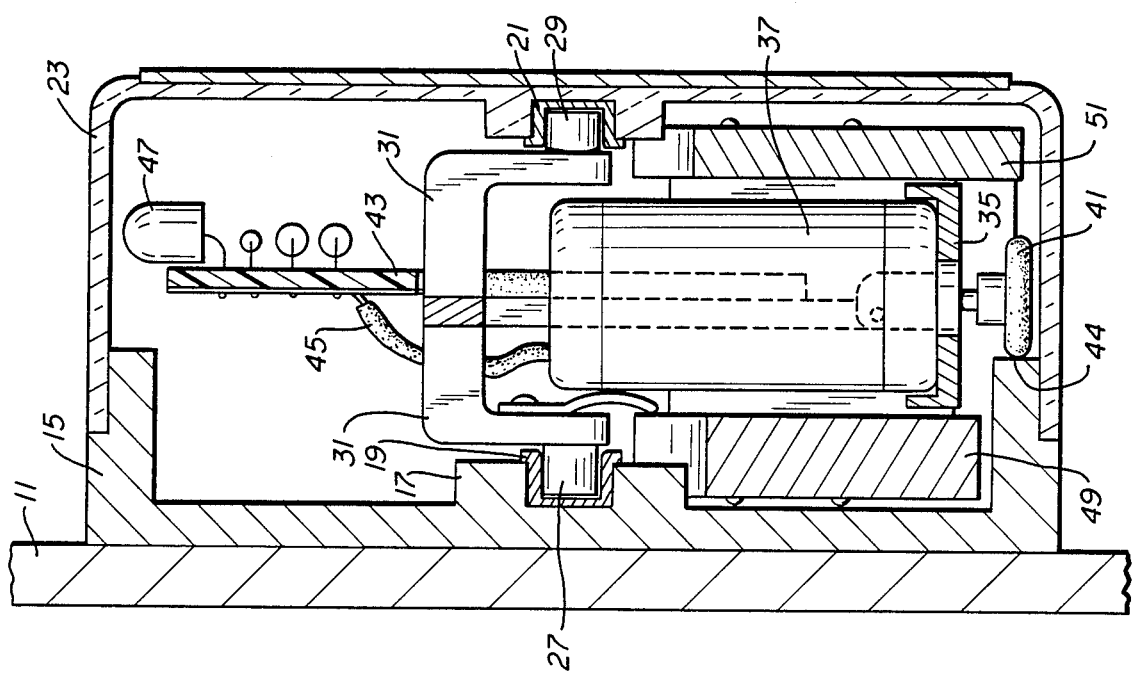

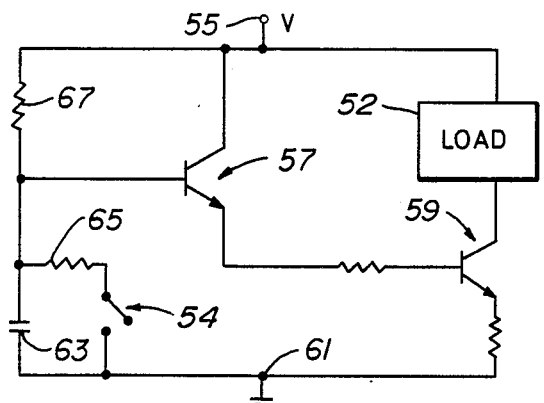
FIG._5.
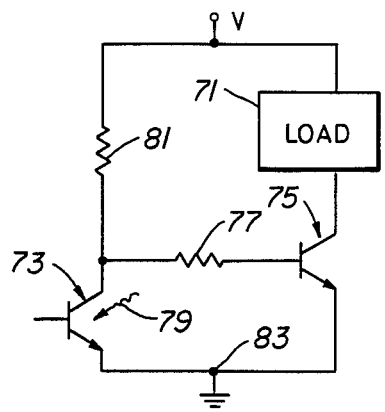
FIG._6.
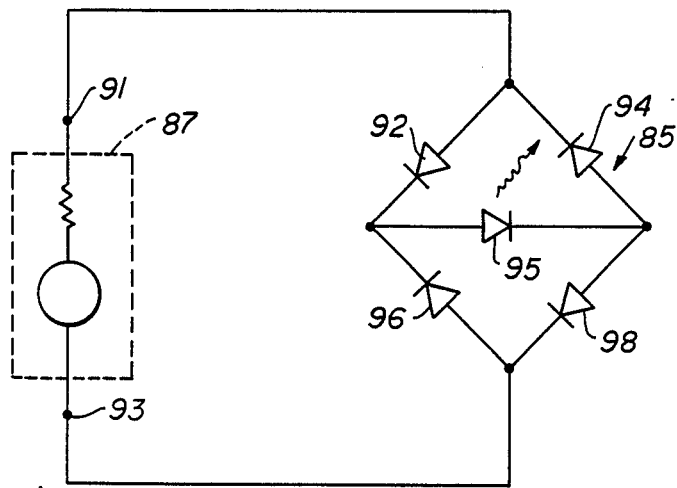
FIG._7.
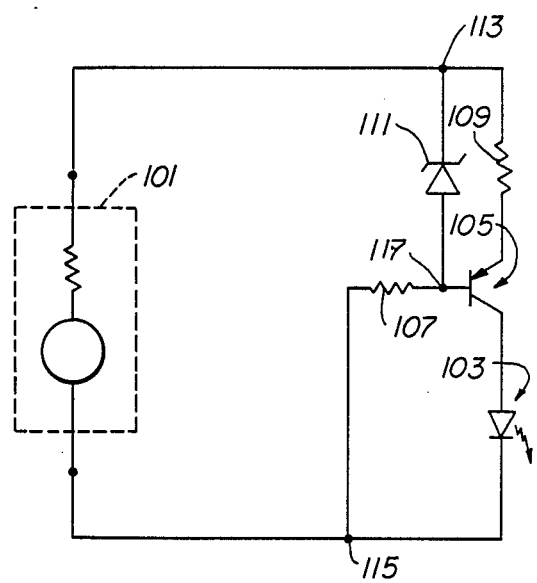
FIG._8.
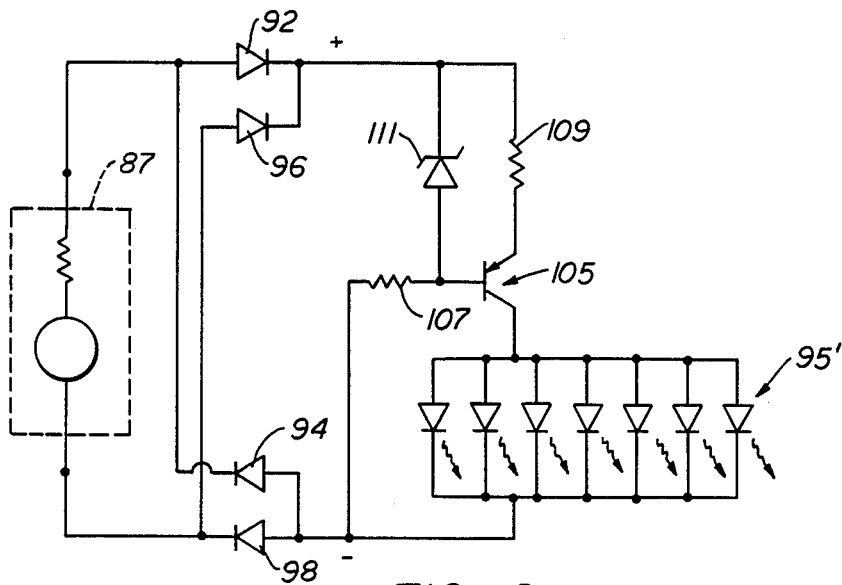
FIG._9.

WHEEL-MOUNTED ELECTRICAL POWER GENERATOR

TECHNICAL FIELD

The invention relates to wheel mounted electrical generators.

BACKGROUND ART

In U.S. Pat. No. 4,539,496 to Thomas et al., a wheel mounted generator for land vehicles is described. The generator resides at an end of an elongated arm pivotally mounted at the center of rotation of the wheel. The generator, suspended like a pendulum from the arm, has a small rotary member in frictional engagement with the periphery of a hub. Rotation of the wheel causes rotation of the rotary member, as the pendulum-like mounting of the generator remains relatively stationary. The mass of the generator housing is principally at the end of the support arm for the housing. While this is highly desirable, it requires use of miniature generators which are quite expensive and limited in output capacity.

An object of the present invention was to devise a wheel mounted electrical generator of the pendulum type which did not require an ultraminiature construction.

DISCLOSURE OF THE INVENTION

The above object has been achieved with the discovery of an electrical power generator assembly which makes fuller use of space within a wheel hub. Such fuller use is achieved by a yoke which is pivotally mounted in the housing for rotation in a vertical plane. The yoke has arm portions extending on both sides of a central pivot axis to take full advantage of the disk-like shape of a wheel hub, yet has a center of gravity which is offset from the pivot point of the yoke so that the yoke behaves, in combination with the generator supported by the yoke, like a pendulum in relation to land. The generator has a rotary member contacting the wheel for turning a rotor of the generator. The relative motion between the wheel and the periphery of the hub is communicated to the generator which generates power. Surrounding the yoke is a circuit board which receives support from the yoke and receives electrical power output from the generator. The circuit board carries an electrical utilization circuit, converting power generated by the generator into useful form. In one embodiment, a series of lamps is illuminated by the output power.

BRIEF DESCRIPTION OF THE DRAWINGS

FIG. 1 is a perspective view of an automotive wheel carrying a hub mounted electrical power generator assembly in accord with the present invention.

FIG. 2 is a perspective exploded view of the power generator assembly shown in FIG. 1.

FIG. 3 is a top plan view of the electrical power generator assembly shown in FIG. 1.

FIG. 4 is a side cutaway view of the electrical power generator assembly illustrated in FIG. 3, taken along lines 4—4.

FIG. 5 is a schematic diagram of a stabilization circuit which may be employed on the circuit board illustrated in FIG. 3.

FIG. 6 is a schematic diagram of a shutdown system which may be employed on the circuit board of FIG. 3.

FIG. 7 is a schematic diagram of a current directionality control circuit which may be used in connection with the circuit board illustrated in FIG. 2.

FIG. 8 is a schematic diagram of a current limiting circuit which may be employed on the circuit illustrated in FIG. 2.

FIG. 9 is a schematic diagram of a combined directionality and current limiting circuit which may be employed on the circuit board illustrated in FIG. 2.

BEST MODE FOR CARRYING OUT THE INVENTION

With reference to FIG. 1, an automotive wheel 11 is shown having a hub mounted electrical power generator assembly 12 in accord with the present invention. The generator assembly 12 may either be integral with wheel 11 or may be fastened thereto. It is important that the axis of rotation 13 of wheel 11 pass through the axis of the power generator assembly housing or hub.

With reference to FIGS. 2-4, axis 13 is seen to pass through the center of housing base 15 having an integral bearing support 17 for receiving journal 19. A similar journal 21 on the distant end of the housing resides in removable housing lid 23. A central yoke 25 has bearing protrusions 27 and 29 which fit into journals 19 and 21. These bearings are cylindrically symmetric and reside along axis 13, forming pivots for yoke 25.

Yoke 25 has four orthogonal downwardly depending arms 31 which provide a support frame for generator 33. The arms have portions on opposite sides of axis 13 to take advantage of the radial space about the axis inside of the hub. In this manner relatively large size generators may be used. This arrangement of the arms is such as to surround generator 33 which is held in place by a locking bracket 35. A spring clip 36 pushes against the generator casing laterally securing its position.

The generator consists of a stator 37 which is fixed relative to yoke 25 and a rotor, inside of the stator, having a projecting rotating shaft 39, extending through locking bracket 35. A rotary member 41 may be a wheel with a rubber rim which is intended to make contact with the circumferential periphery 44 of housing base 15. The base may incorporate a race or rim or shoulder for contact with the rotary member, although this is not necessary. The shoulder may have about the same width as the wheel or be slightly wider. A round circuit board 43 is also supported by yoke 25, to take advantage of radial space not occupied by the generator 33. The generator has output electrical wires 45 which feed power to circuit board 43. The circuit board carries an electrical utilization circuit, using power from the generator 33, carried along lines 45, to perform a useful function such as illumination of lamps 47. Other circuits described below may also be mounted on the board and components 46 are associated with the various circuits. If cup-shaped housing lid 23 is transparent, light from lamps 47 may be seen through the housing.

A pair of metal weights 49 and 51 are clamped to yoke 25 by means of fasteners extending through holes 50 in the yoke and 53 in the weights. The weights are sufficiently massive as to shift the center of gravity of the entire generator assembly radially downwardly and away from pivot axis 13. Thus, although the generator may be more or less balanced about the pivot axis, there still can be pendulum-like behavior by this shift in the center of gravity of pivoted generator and yoke. If the generator has an offset center of gravity weights may not be needed. The weights have, in profile, the shape of the radially outward portion of a circular sector, with the center of gravity of the masses being on the line perpendicular to the pivot axis and symmetrically dividing the masses, causing the yoke with the connected masses to behave as a pendulum in relation to land on which a supporting wheel rests, so long as the wheel is stationary.

As the wheel rotates, especially at highway speeds, there is a tendency for the power generator assembly to rotate with the wheel since an electromagnetic torque couple is developed between rotary member 41 and the rim or race 43 on which it turns. If the generator assembly begins rotating with the wheel, there is no longer any relative motion between the housing and the generator and so power generation ceases. A circuit has been devised, mounted on the circuit board 43 which maintains pendulum motion even when the wheel rotates at highway speeds.

The circuit of FIG. 5 shows a load 52 which is the generator armature which is part of the stator. If the stator is not excited by at least a low level of current, the generator is not enabled and the degree of friction between rotor and stator is minimal. In this condition, with friction minimized, the generator will tend to fall as a pendulum toward a gravitational line of force compared to the situation where the generator is generating electrical power and friction is much higher. A microswitch 54 is disposed in the housing, near its periphery, which closes when the axis of the rotary member of the generator rises above the nine o'clock or three o'clock positions, i.e. exceeds ninety degrees to the vertical. Other angles may be used. The circuit is biased by a supply voltage applied at terminal 55. When microswitch 54 is open, transistors 57 and 59 are on and current flows through load 52 toward ground terminal 61, maintaining the electrical generator in a generating condition. When the micro-switch 54 is closed, whenever the yoke and generator are turning beyond the nine o'clock or three o'clock positions, the capacitor 63 discharges through resistor 65. Transistors 57 and 59 are turned off and the current through the load drops to close to zero, turning off the generator until it resumes a position below the three o'clock or nine o'clock positions or other selected angle relative to an initial position. When this occurs, the micro-switch 54 is again opened and capacitor 63 charges through resistor 67. This causes transistors 57 and 59 to turn on again with current increasing thereby allowing the generator to again become operative. Time periods for operation of the circuit may be adjusted by choices of resistors 67, 65 and capacitor 63.

FIGS. 2–4 show electrical lamps as the utilization circuit. For this situation, it is not necessary that the lamps be operative in daylight. FIG. 6 shows a daylight generator disabling circuit. Load 71 is associated with the power producing element of the generator. Open base transistor 73 is a phototransistor, while transistor 75 is an ordinary transistor. Resistor 77 biases the transistor 75. In the presence of light exceeding a preset limit, indicated by arrow 79, current flows through resistor 81 to ground terminal 83, generally bypassing load 71. In the absence of light, transistor 73 is off and current flows through load 71. In balancing the left and right arms of the circuit of FIG. 6 by selected values of the resistors, there are applications when mechanical considerations would indicate that some current flowing through load 71 at all times might be desirable. Operation of the generator even when power is not needed for the purpose of operating lights, or for other reasons, still may have beneficial effects. The mechanical inertia which is provided by generator operation tends to provide a magnetic shock cushion, absorbing vertical shocks and vibrations. In some situations, it may be undesirable to utilize the circuit of FIG. 6 in disabling the generator power assembly.

The circuit of FIG. 7 shows a diode bridge 85 which is connected electrically in parallel with generator 87 indicated schematically within the dashed line. Regardless of the polarity of generator 87 with respect to terminals 91 and 93, current will always flow through the utilization element 95 in the proper direction due to action of diodes 92, 94 on one side and diodes 96 and 98 on the opposite side. A reversal of polarity can occur when the generator is associated with a wheel which is mounted on an opposite side of a vehicle.

FIG. 8 shows a current limiting circuit for the generator assembly shown within the dashed line 101. The load operated by the circuit is the light emitting diode 103 which is electrically connected to transistor 105. In turn, the transistor 105 is connected to resistors 107 and 109 as well as to the Zener diode 111. If the voltage between nodes 113 and 115 become excessive, exceeding a threshold voltage, the voltage between nodes 117 and 113 will increase to the point where the Zener breakdown potential of diode 111 is reached. At this point the transistor 105 will no longer conduct as previously, but will be limited to a lesser degree of current, depending on the values of resistors 109 and 107. This current limiting action insures that the generator torque coupling is limited to prevent the generator from co-rotating with the drive wheel.

In FIG. 9, the circuits of FIG. 7 and FIG. 8 are combined. Diodes 92, 94, 96 and 98 form a diode bridge allowing bidirectional rotation of the wheel with power generation as described herein with respect to the lamp array 95', forming a utilization circuit. The Zener diode 111, in combination with transistor 105 and resistors 107 and 109 form a current limiting branch, protecting generator 87. The components of FIGS. 5–9 are mounted directly on the circuit board. Any of the circuits, or some of them, shown in FIGS. 5–9 can be mounted on the circuit board 43 of FIG. 2. Different circuits may be used for different desired purposes.

While utilization circuits have been shown to be mounted on a circuit board within the hub, other utilization circuits may be outside of the hub. As motor vehicles begin to have more and more electrical sensors, such as tire pressure sensors, brake temperature sensors, brake fluid level sensors, and so on, it is desirable to provide power generation mounted to the wheel near the sensors to preclude commutation or contact with the wheel or electrical supply from a main battery supply. The present invention may be used with such sensors, as well as with data reduction circuitry to analyze results and simplify signaling to a vehicle operator. Because of the miniaturization of electronics, most or all of the utilization circuitry may be mounted within a wheel hub and powered by a small electrical generator of the type described herein.

While the apparatus of the present invention has been described with relation to wheels, particularly for land vehicles, the invention may be used on wheels not associated with land vehicles, such as wheels in gears in industrial machines. In such applications, the apparatus is mounted directly on one side of the wheel or gear, just as on a wheel of a land vehicle, with the axis of rotation of the yoke corresponding with the axis of rotation of the wheel or gear.

We claim:

1. An electrical power generator assembly for mounting on a wheel comprising,
   (a) a housing means for attachment to a side of a wheel having an axis of rotation, the housing having a periphery defining a circumferential path and a pivot axis aligned with said axis of rotation,
   (b) yoke means pivotally mounted about said pivot axis in the housing with pendulum-like behavior in a vertical plane, said yoke means having a plurality of arms supporting a miniature electrical generator having a rotor and a stator, the stator supported in fixed relation to the yoke means and the rotor being rotatably supported within the stator and having an axial rotor shaft projecting from the stator, said yoke means and said generator having a center of gravity distal to the pivot of said yoke means in pendulum relation relative to land,
   (c) a rotary member mounted at a radially outward end of the rotor shaft in a manner communicating with the circumferential path thereby allowing turning of the rotor in the generator upon rotation of the yoke means, in said vertical plane, the rotor and stator having an electrical output line, and
   (d) a circuit board receiving as an input said electrical power output line and having an electrical utilization circuit in electrical communication with said output line.

2. The apparatus of claim 1 wherein said circuit board is supported from said yoke means.

3. The apparatus of claim 1 wherein said yoke means further comprises a metal weight having the radially outward shape, in profile, of a portion of a circle.

4. An electrical power generator assembly for mounting on a wheel comprising,
   (a) a housing means for attachment to a side of a wheel having an axis of rotation, the housing having a periphery defining a circumferential path and a pivot axis aligned with said axis of rotation,
   (b) yoke means pivotally mounted about said pivot axis in the housing with pendulum-like behavior in a vertical plane, said yoke means having a plurality of arms supporting a miniature electrical generator having a rotor and a stator, the stator supported in fixed relation to the yoke means and the rotor being rotatably supported within the stator and having an axial rotor shaft projecting from the stator, said yoke means and said generator having a center of gravity distal to the pivot of said yoke means in pendulum relation relative to land,
   (c) a rotary member mounted at a radially outward end of the rotor shaft in a manner communicating with the circumferential path thereby allowing turning of the rotor in the generator upon rotation of the yoke means, in said vertical plane, the rotor and stator having an electrical output line,
   (d) a circuit board receiving as an input said electrical power output line and having an electrical utilization circuit in electrical communication with said output line, and
   (e) an electrical switch mounted in fixed relation relative to the housing and generating a signal associated with an angular position of the yoke exceeding a preset angle, said signal disabling generation of electrical power.

5. The apparatus of claim 4 further comprising circuit means connected to said generator for disabling said generator in the presence of light exceeding a preset limit.

6. The apparatus of claim 1 further comprising circuit means connected to said generator for directing electrical power output through a load independent of the direction of rotation of said land vehicle wheel.

7. The apparatus of claim 1 further comprising circuit means connected to said generator for limiting the amount of current through a utilization circuit.

8. An electrical power generator assembly for mounting on a wheel comprising,
   (a) a housing having a central pivot axis, said housing adapted to be mounted in a hub relation relative to a wheel which rotates about a wheel axis, the pivot axis and the wheel axis being generally coaxial, the housing having a periphery defining a circumferential path,
   (b) a yoke pivotally mounted in the housing with pendulum-like behavior about said pivot axis, in a vertical plane, said yoke having radially opposed first and second sides,
   (c) a miniature electrical generator having a rotor and a stator, the stator supported from said yoke, the rotor being rotatably supported within the generator and having an axial rotor shaft projecting from the generator,
   (d) a rotary member mounted at a radially outward end of the rotor shaft in a manner contacting said circumferential path thereby allowing turning of the rotor in said generator upon circumferential motion of the yoke within the housing, the rotor and stator having an electrical power output line,
   (e) a circuit board supported from the yoke, said circuit board receiving as an input said electrical power outlet line and having an electricity utilization circuit in electrical communication with said output line, and
   (f) a mass, joined to said yoke, having a center of gravity distal to said pivot axis for orienting said yoke in a pendulum relation relative to land.

9. An electrical power generator assembly for mounting on a wheel comprising,
   (a) a housing having a central pivot axis, said housing adapted to be mounted in a hub relation relative to a wheel which rotates about a wheel axis, the pivot axis and the wheel axis being generally coaxial, the housing having a periphery defining a circumferential path,
   (b) a yoke pivotally mounted in the housing with pendulum-like behavior about said pivot axis, in a vertical plane, said yoke having radially opposed first and second sides,
   (c) a miniature electrical generator having a rotor and a stator, the stator supported from said yoke, the rotor being rotatably supported within the generator and having an axial rotor shaft projecting from the generator,
   (d) a rotary member mounted at a radially outward end of the rotor shaft in a manner contacting said circumferential path thereby allowing turning of the rotor in said generator upon circumferential motion of the yoke within the housing, the rotor and stator having an electrical power output line, (e) a circuit board supported from the yoke, said circuit board receiving as an input said electrical power outlet line and having an electricity utilization circuit in electrical communication with said output line, (f) a mass, joined to said yoke, having a center of gravity distal to said pivot axis for orienting said yoke in a pendulum relation relative to land, and (g) an electrical switch mounted in fixed relation relative to the housing and generating a signal associated with an angular position of the yoke exceeding a preset angle, said signal disabling generation of electrical power.

10. The apparatus of claim 8 wherein said housing has a round base and a cup-shaped round cover disposed over the base.

11. The apparatus of claim 10 wherein said cup-shaped housing cover is at least partially transparent.

12. The apparatus of claim 8 wherein said housing is permanently mounted to a land vehicle wheel.

13. The apparatus of claim 8 wherein said housing is removably attached to a land vehicle wheel.

14. The apparatus of claim 8 wherein said yoke is U-shaped.

15. The apparatus of claim 8 wherein said pivot axis is defined within said housing by journals in spaced apart locations within the housing.

16. The apparatus of claim 8 wherein said rotary member is a small wheel.

17. The apparatus of claim 16 wherein said wheel has a rubber rim.

18. The apparatus of claim 16 wherein said circumferential path is a shoulder of said housing.

19. The apparatus of claim 18 wherein said shoulder has generally the same width as said rubber rimmed wheel.

20. The apparatus of claim 8 wherein said mass comprises a metal weight having the general radially peripheral shape, in profile, of a portion of a circle.

21. The apparatus of claim 20 wherein said metal weight comprises two halves for mounting in mutually facing relation on opposite sides of said yoke.

22. The apparatus of claim 8 wherein said electricity utilization circuit is mounted inside of said housing.

23. The apparatus of claim 8 wherein said electricity utilization circuit is at least partially outside of said housing.

24. The apparatus of claim 8 wherein said electricity utilization circuit includes a plurality of lamps.

25. The apparatus of claim 24 wherein said lamps are disposed in an arcuate pattern.

26. The apparatus of claim 9 further comprising circuit means connected to said generator for disabling said generator in the presence of light exceeding a preset limit.

27. The apparatus of claim 8 further comprising circuit means connected to said generator for directing electrical power output through a load independent of the direction of rotation of said land vehicle wheel.

28. The apparatus of claim 8 further comprising circuit means connected to said generator for limiting the amount of current through a utilization circuit.

* * * * *